S. E. BAILOR.
CULTIVATOR.
APPLICATION FILED FEB. 15, 1912.
1,084,123.
Patented Jan. 13, 1914.
2 SHEETS—SHEET 1.
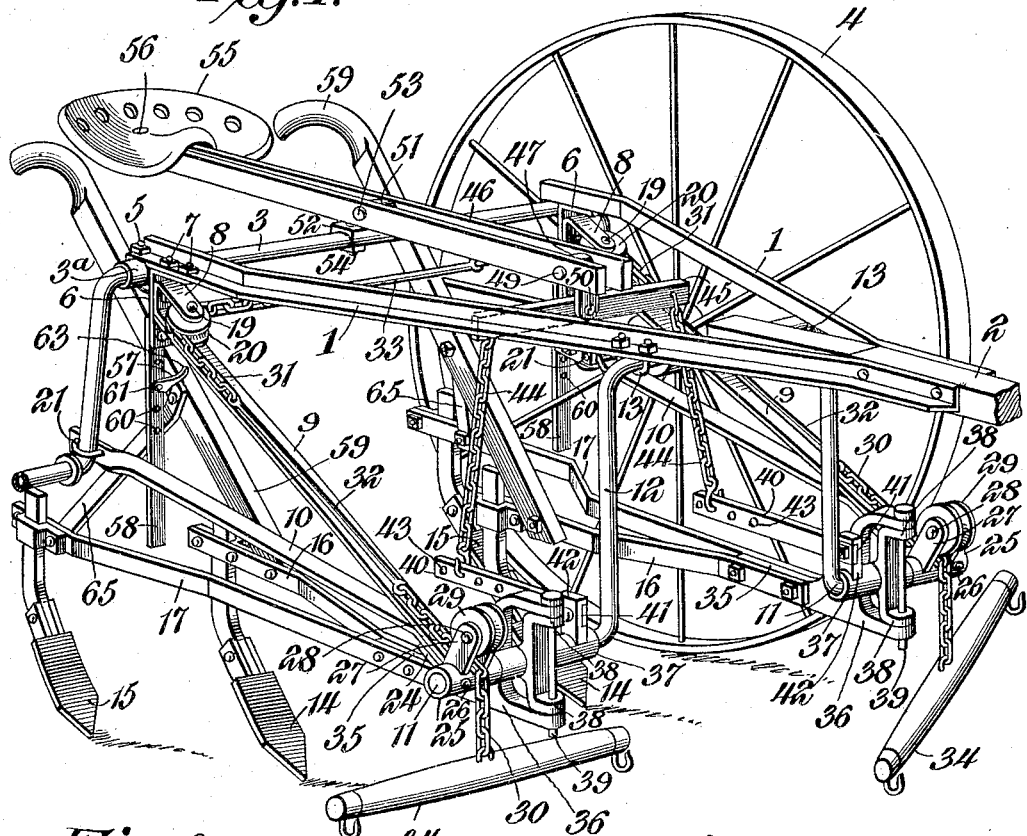
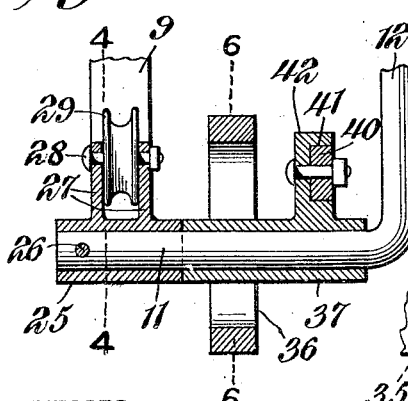
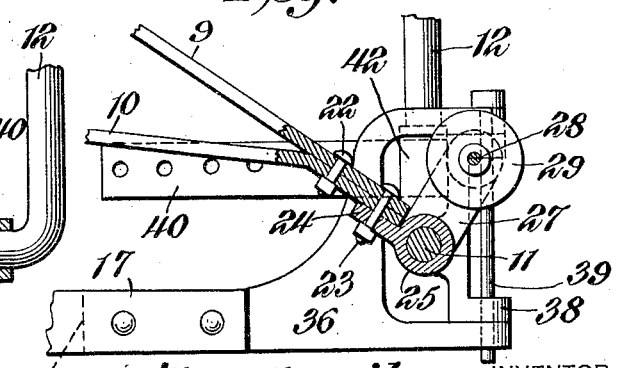
WITNESSES
Silas E. Bailor, INVENTOR,
BY
ATTORNEY S. E. BAILOR.
CULTIVATOR.
APPLICATION FILED FEB. 15, 1912.
1,084,123.
Patented Jan. 13, 1914.
2 SHEETS—SHEET 2.
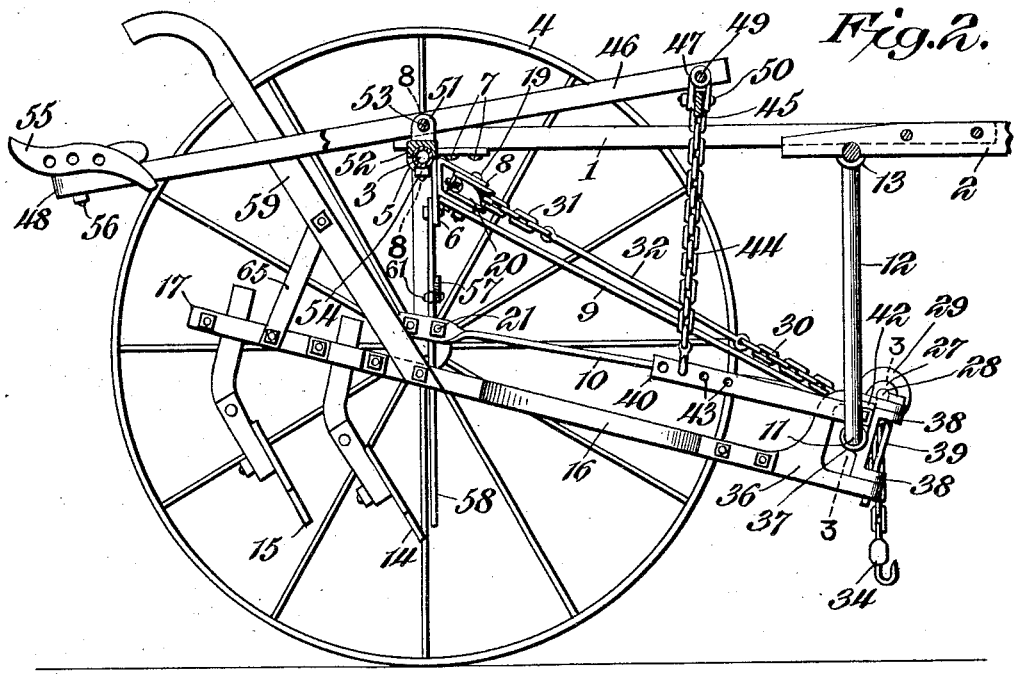
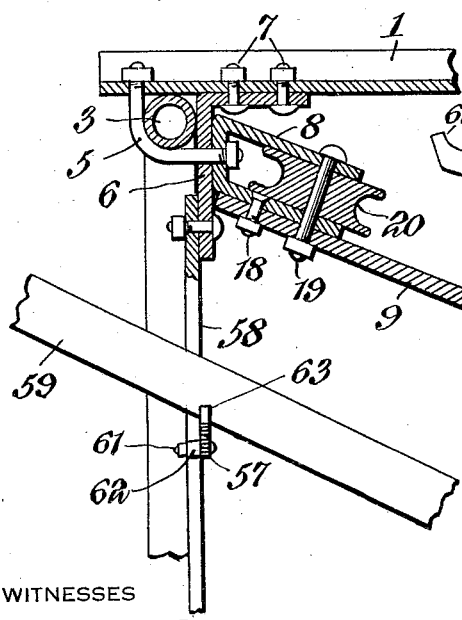
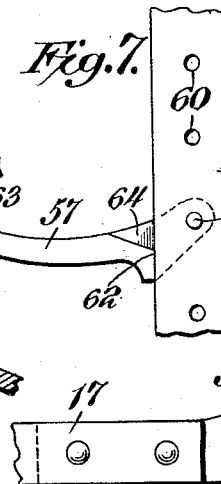
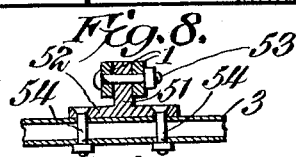
WITNESSES
Howard D. Orr.
H. F. Riley.
Silas E. Bailor, INVENTOR,
BY
C. G. Siggers
ATTORNEY

UNITED STATES PATENT OFFICE.

SILAS E. BAILOR, OF ATCHISON, KANSAS.

CULTIVATOR.

1,084,123.  Specification of Letters Patent.  Patented Jan. 13, 1914.

Application filed February 15, 1912. Serial No. 677,743.

*To all whom it may concern:*

Be it known that I, SILAS E. BAILOR, a citizen of the United States, residing at Atchison, in the county of Atchison and State of Kansas, have invented a new and useful Cultivator, of which the following is a specification.

The invention relates to improvements in cultivators.

The object of the present invention is to improve the construction of cultivators, and to provide a simple efficient and comparatively inexpensive one-row cultivator, equipped with means adapted to enable the weight of the driver or operator when he is occupying the seat of the cultivator to lift the beams and the shovels or other cultivating devices clear of the ground, so that the cultivator may be readily driven from one field or place to another without the cultivating devices coming in contact with the ground.

A further object of the invention is to provide a cultivator of this character having cultivator beams capable of vertical and lateral manual adjustment, and in which the said lifting mechanism will not interfere with such movements or adjustments of the beams while cultivating the soil.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a cultivator, constructed in accordance with this invention. Fig. 2 is a central longitudinal sectional view of the same. Fig. 3 is a detail sectional view, taken substantially on the line 3—3 of Fig. 2. Fig. 4 is a detail sectional view on the line 4—4 of Fig. 3. Fig. 5 is a detail sectional view of the rear portion of the frame of the cultivator, illustrating the manner of mounting the rear guide wheels and the side guards. Fig. 6 is a detail sectional view on the line 6—6 of Fig. 3. Fig. 7 is a detail view of one of the handle bar supporting hangers. Fig. 8 is a detail sectional view on the line 8—8 of Fig. 2.

Like numerals of reference designate corresponding parts in all the figures of the drawings.

In the accompanying drawings in which is illustrated the preferred embodiment of the invention, 1—1 designate rearwardly diverging angle iron frame bars, constituting the side bars of the frame of the cultivator, and bolted or otherwise secured at their front ends to the side faces or edges of the rear portion of the draft pole or tongue 2 of the cultivator, and having their rear ends connected to and supported by an arched axle 3, preferably constructed of tubular metal and having laterally extending spindle portions on which are mounted carrying wheels 4. The front and rear ends of the angle iron frame bars have slight angular bends to arrange them in parallelism, and the rear ends are secured to the arch of the axle adjacent to the inner edges of fixed stop collars or sleeves 3$^a$ by approximately L-shaped bolts 5 partially embracing the rear portion of the axle and having vertical and horizontal arms or portions. The vertical arms of the bolts 5 extend upward in rear of the top of the arch of the axle and pierce the angle iron frame bars, while the horizontal arms extend forwardly beneath the arch of the axle and pass through depending portions of approximately L-shaped bars or members 6, which are secured by bolts 7 to the angle iron frame bars in advance of the arch of the axle. The arch of the axle fits against the depending portions of the L-shaped bars or members, which assist in mounting the cultivator frame upon the axle, as clearly illustrated in Fig. 5 of the drawings. Both terminals of the bolts 5 are equipped with nuts, and the forwardly extending arms or portions of the said bolts 5 also pierce pulley supporting brackets 8, each composed of inclined upper and lower sides and a vertical connecting rear portion, fitted against the depending portion of the adjacent L-shaped bar or member.

The arched axle is connected at opposite sides by braces 9 and 10 with laterally extending pivot portions 11 of a front inverted U-shaped yoke or arch 12, secured at the top by U-bolts 13, or other suitable means to the angle iron frame bars and having depending vertical sides from the lower ends of which the pivot portions 11 extend. The front yoke, which is located in advance of the arch of the axle is adapted to straddle a row of plants to permit shovels 14 and 15 of cultivator beams 16 and 17 to operate on the soil at opposite sides of the row. The braces 9 extend upwardly and rearwardly from opposite sides of the front yoke to the pulley supporting brackets 8, and their upper or rear ends are secured to the lower inclined sides of the same by bolts 18 and 19. The bolts 18 pierce the braces 9 and the lower sides of the pulley brackets 8, while the bolts 19 pass through the braces 9 and extend entirely through the brackets and constitute pivots or spindles for pulleys 20, which are mounted within the said brackets.

The rear ends of the braces 10 are secured to the sides of the arched portion of the axle at the inner ends of the laterally extending pivot portions by U-shaped bolts 21. The front ends of the braces 10 are angularly bent and fitted against the front ends of the braces 9, and are secured to the same by bolts 22 and 23, the bolts 23 also passing through rearwardly extending lugs 24 of fixed supporting sleeves 25, which are mounted on the laterally extending pivot portions of the yoke 12. The fixed sleeves, which are secured on the outer ends of the laterally extending pivot portions by pins 26, are provided with upwardly and forwardly projecting bearing arms 27, having registering perforations for the reception of bolts 28 upon which front pulleys 29 are mounted. The front and rear pulleys are grooved to receive front and rear chains 30 and 31, or other suitable flexible connections, preferably connected by side and rear rods 32 and 33. The front chain is also connected with swingletrees 34, located at opposite sides of the cultivator in advance of the pivot portions of the yoke. By this arrangement, the draft is applied to the rear portion of the cultivator frame directly over the cultivating devices.

The cultivator beams are secured by bolts or other suitable fastening devices to the opposite sides of rearwardly extending shanks or bars 35 of coupling yokes 36, arranged vertically and having upper and lower forwardly projecting portions, which extend above and below coupling sleeves 37 and fitted against upper and lower bearing arms 38 thereof. The bearing arms 38, which are formed integral with the coupling sleeves, are approximately L-shaped and have forwardly projecting ears or portions provided with perforations registering with perforations of the upper and lower sides of the coupling yokes and receiving pivots 39, arranged vertically when the cultivator or plow beams 16 and 17 are in a horizontal position, and adapted to permit the same to swing laterally to the right or left. The coupling sleeves 37 are arranged on the horizontal laterally extending pivot portions of the yoke 12 between the outer fixed sleeves and the sides of the yoke, as clearly shown in Fig. 3 of the drawings, and they permit the cultivator beams to be swung upwardly and downwardly to insert the shovels into the soil the desired depth, and also to permit the shovels or other cultivating devices to be arranged clear of the ground.

The coupling sleeves are equipped with rearwardly extending arms 40, secured at their front ends in recesses 41 of lugs 42, formed integral with and projecting upwardly from the coupling sleeves adjacent to the inner ends thereof. The arms 40 are provided at their rear portions with perforations 43, arranged at intervals and adapted to receive links of chains 44, connected at their upper ends to a transverse equalizing lever 45, which is centrally suspended from a longitudinal seat supporting lever 46 by an approximately U-shaped hanger 47. By connecting the coupling sleeves with the lever 46 in this manner the means for lifting the plow or cultivator beams does not interfere with the free lateral movement thereof. The seat supporting lever, which is arranged centrally of the cultivator, is composed of two sides, preferably constructed of a single piece of metal, centrally bent to form a rear connecting bend or portion 48. The hanger 47 is secured between the front portions of the sides of the seat supporting lever by a bolt 49, and it straddles the transverse lever and is connected with the same by a bolt 50. The seat carrying lever 46 is pivoted at a point intermediate of its ends to an ear or lug 51 of a plate or support 52 by a bolt 53, and it is adapted to be oscillated by the weight of the driver or operator to elevate the cultivator or plow beams and raise the shovels or other cultivating devices clear of the ground, as illustrated in Fig. 2 of the drawings. The plate or support 52 has a concave lower face and saddles the arch of the axle at the front portion thereof and is secured to the same by bolts 54, piercing the axle and the support 52 at opposite sides of the upwardly projecting lug or ear 51, which extends between the sides of the seat supporting lever. A seat 55 is adjustably secured to the rear portion of the lever 46 by a bolt 56, and it is adapted to be adjusted backwardly or forwardly on the lever to arrange it to suit the weight of the driver or operator. When the driver occupies the seat, his weight depresses the rear arm of the longitudinal lever 46 and elevates the plow or cultivator beams.

The plow or cultivator beams are adapted to be supported in an elevated position by a pair of laterally projecting beam hangers 57, pivoted at one end to and extending inwardly from depending vertical guards 58, consisting of straight bars secured at their upper ends to the L-shaped bars or members 6 of the cultivator frame. The depending vertical bars 58 are located outside and beyond the handles 59, and they are adapted to be engaged by the same to limit the lateral swing or adjustment of the plow or cultivator beams to prevent the shovels from coming in contact with the supporting or carrying wheels 4. The guards 58 are provided with a plurality of perforations 60, arranged at intervals and adapted to receive pivot bolts 61 for securing the beam hangers to the guards. The beam hangers, which are provided adjacent to their pivot portions with stop shoulders 62 for engaging the inner side edges of the guards, have slightly concave upper edges or faces to receive the handles 59, and their free terminals 63 are upturned for retaining the handles on the upper edges or faces of the beam hangers. The stop shoulders 62 limit the downward swing of the beam hangers and support the same in an approximately horizontal position. The said beam hangers are recessed or cut-away at 64 above the stop shoulders to permit the said hangers to swing upwardly from a horizontal position. By this construction, the handles are adapted to be lifted above the beam hangers and after they have passed the latter, the beam hangers will automatically drop beneath the handles and support the same in an elevated position. The handles 59 are secured at their lower ends to the inner beams 16, and they are connected with the outer beams by transversely disposed inclined braces 65.

What is claimed is:—

1. A cultivator of the class described including an arched axle, a frame supported by the arched axle, a yoke rigid with and depending from the frame in advance of the arched axle and having horizontal pivots, coupling sleeves mounted in the pivots, fixed sleeves secured to the said pivots and fitting against the outer ends of the coupling sleeves to retain the latter on the said pivots, longitudinal braces connected at their front ends with the fixed sleeves and at their rear ends with the arched axle and forming rigid connections between the top of the axle and the lower portion of the sides of the yoke, and cultivator beams connected with the coupling sleeves.

2. A cultivator of the class described including an arched axle, a frame having spaced side bars supported by the axle, a yoke rigid with and depending from the frame in advance of the arched axle and having laterally extending horizontal pivots, coupling sleeves mounted on the pivots, fixed sleeves secured to the pivots, longitudinal braces connected at their front ends to the fixed sleeves and at their rear ends with the spaced side bars, said braces forming rigid connections between the top of the axle and the rigid sides of the yoke, and cultivator beams connected with the sleeves.

3. A cultivator of the class described including an arched axle, a frame supported by the axle, a yoke depending from the frame and having pivots extending laterally from the sides of the yoke, fixed sleeves secured on the outer portions of the pivots, coupling sleeves arranged on the inner portions of the pivots between the fixed sleeves and the sides of the yoke, braces rigidly connected at their ends with the fixed sleeve and with the axle, a pivotally mounted seat supporting lever, cultivator beams pivotally connected with the coupling sleeves, and means for connecting the seat supporting lever with the coupling sleeves independently of the pivotal connection between the cultivator beams and the said sleeves.

4. A cultivator of the class described including an arched axle, a frame having side bars supported by the arched axle, a yoke rigid with and depending from the frame in advance of the arched axle and having laterally extending horizontal pivots, coupling sleeves mounted on the inner portions of the horizontal pivots, fixed sleeves secured on the outer portions of the pivots, longitudinal braces connected at their front ends with fixed sleeves and at their rear ends with the arched axle, and cultivator beams connected with the coupling sleeves.

5. A cultivator of the class described including an arched axle, a frame supported by the arched axle, a yoke located in advance of the arched axle and depending from the frame and having laterally extending horizontal pivots, coupling sleeves arranged on the inner portions of the horizontal pivots, fixed sleeves secured on the outer portions of the horizontal pivots, and longitudinal braces arranged in pairs and having their front ends fitted together and secured to the fixed sleeves, the said braces diverging rearwardly and connected at their rear ends with the upper and lower portions with the arch of the axle, and cultivator beams connected with the coupling sleeves.

6. A cultivator of the class described including an arched axle, a frame supported by the axle, a yoke depending from the frame in advance of the axle and having laterally extending pivots, coupling sleeves mounted on the inner portions of the pivots, fixed sleeves secured on the outer portions of the pivots and provided with upwardly extending bearing arms and having rearwardly extending lugs, inclined longitudinal braces secured to the said lugs and extending upwardly and rearwardly from the fixed sleeves, pulley brackets carried by the frame at opposite sides thereof adjacent to the top of the arched axle and secured to the upper ends of the inclined braces, cultivator beams connected with the coupling sleeves, rear pulleys mounted in the said brackets, front pulleys mounted in the bearing arms of the fixed sleeves, and a draft connection having flexible connections guided by the said pulleys.

7. A cultivator of the class described including an arched axle, a frame, a yoke depending from the frame in advance of the axle and having horizontal pivots, coupling sleeves mounted on the horizontal pivots, cultivator beams pivotally connected with the coupling sleeves and arranged to swing horizontally on their pivots and vertically on the said horizontal pivots, and means located at opposite sides of the cultivator for limiting the lateral outward swing of the cultivator beams.

8. A cultivator of the class described including an arched axle, a frame, a yoke depending from the frame in advance of the axle, cultivator beams, means for pivotally connecting the same with the said yoke to permit the said beams to swing vertically and horizontally, handles connected with the beams, and guards depending from the frame at the outer sides of the handles and arranged to be engaged by the same to limit the outward swing of the beams.

9. A cultivator of the class described including an arched axle, a frame, a yoke depending from the frame in advance of the axle and having horizontal pivots, coupling sleeves mounted on the horizontal pivots, cultivator beams pivotally connected with the coupling sleeves and arranged to swing horizontally on their pivots and vertically on the said horizontal pivots, handles connected with the beams, and guards depending from the frame at the outer sides of the handles and arranged to be engaged by the same to limit the outward swing of the beams.

10. A cultivator of the class described including an arched axle, a frame, a yoke depending from the frame in advance of the axle and having horizontal pivots, coupling sleeves mounted on the horizontal pivots, cultivator beams pivotally connected with the coupling sleeves and arranged to swing horizontally on their pivots and vertically on the said horizontal pivots, handles connected with the beams, and pivotally mounted beam hangers normally located above the said handles and having means for limiting their downward swing and adapted to be swung upwardly by the said handles to per-mit the latter to pass beyond and to be lowered by them.

11. A cultivator of the class described including an arched axle, a frame, a yoke depending from the frame in advance of the axle and having horizontal pivots, coupling sleeves mounted on the horizontal pivots, cultivator beams pivotally connected with the coupling sleeves and arranged to swing horizontally on their pivots and vertically on the said horizontal pivots, handles connected with the beams, and pivotally mounted beam hangers having stop shoulders for limiting their downward movement and recessed or cut-away above the shoulders to permit them to be swung upwardly by the handles, said beam hangers being adapted to drop beneath the handles for supporting the same.

12. A cultivator of the class described including an arched axle, a frame, a yoke depending from the frame in advance of the axle and having horizontal pivots, coupling sleeves mounted on the horizontal pivots, cultivator beams pivotally connected with the coupling sleeves and arranged to swing horizontally on their pivots and vertically on the said horizontal pivots, handles connected with the beam, depending vertical guards carried by the cultivator and located at the outer sides of the handles for limiting the lateral swing of the cultivator beams, and beam hangers pivoted to and extending from the said guards and provided with means for limiting their downward swing, said hangers being adapted to be swung upwardly by the handles to permit the same to pass them.

13. A cultivator of the class described including an arched axle, side bars supported by the axle, L-shaped bars secured to the side bars in advance of the axle, approximately L-shaped bolts embracing the axle and piercing the side bars and the L-shaped bars, forwardly projecting pulley brackets secured to the L-shaped bars by the said bolts, a yoke depending from the side bars in advance of the axle and having transversely disposed horizontal pivots, coupling sleeves mounted on the inner portions of the said pivots, fixed sleeves secured on the outer portions of the said pivots, braces secured to the fixed sleeves and to the pulley brackets, and cultivator beams connected with the coupling sleeves.

In testimony, that I claim the foregoing as my own, I have hereto affixed my signature in the presence of two witnesses.

SILAS E. BAILOR.

Witnesses:
W. H. JONES,
DENNIS BEAVER.

---

Copies of this patent may be obtained for five cents each, by addressing the "Commissioner of Patents, Washington, D. C."